US012683882B2

(12) United States Patent
Pefkianakis

(10) Patent No.: US 12,683,882 B2
(45) Date of Patent: Jul. 14, 2026

(54) DEVICE-BASED SYSTEM TO ESTIMATE CELLULAR WIRELESS ACCESS NETWORK LATENCY

(71) Applicant: Apple Inc., Cupertino, CA (US)

(72) Inventor: Ioannis Pefkianakis, San Jose, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 18/324,851

(22) Filed: May 26, 2023

(65) Prior Publication Data

US 2024/0396817 A1     Nov. 28, 2024

(51) Int. Cl.
| | |
|---|---|
| *H04L 43/0864* | (2022.01) |
| *H04L 43/0823* | (2022.01) |
| *H04L 43/0829* | (2022.01) |
| *H04L 43/0852* | (2022.01) |

(Continued)

(52) U.S. Cl.
CPC ...... *H04L 43/0864* (2013.01); *H04L 43/0835* (2013.01); *H04L 43/0847* (2013.01); *H04L 43/0852* (2013.01); *H04L 43/16* (2013.01); *H04W 24/08* (2013.01)

(58) Field of Classification Search
CPC ............. H04L 43/0864; H04L 43/0835; H04L 43/0852; H04L 43/16; H04L 43/0847; H04W 24/08
See application file for complete search history.

(56) References Cited

U.S. PATENT DOCUMENTS

| | | | |
|---|---|---|---|
| 10,149,293 B2 | 12/2018 | Damnjanovic et al. | |
| 10,771,224 B2 | 9/2020 | Gao et al. | |
| 2016/0212763 A1* | 7/2016 | Hua ..................... | H04W 12/00 |

(Continued)

FOREIGN PATENT DOCUMENTS

| | | |
|---|---|---|
| EP | 3435577 B1 | 11/2022 |
| WO | 2022/213913 A1 | 10/2022 |

OTHER PUBLICATIONS

Nakayama et al., Wavelength and Bandwidth Allocation for Mobile Fronthaul in TWDM-PON, IEEE Transactions on Communications, vol. 67, No. 11, p. 7642-7655, Total 14 Pages, Nov. 2019. (Year: 2019).*

(Continued)

*Primary Examiner* — Brian J. Gillis
*Assistant Examiner* — Chhian (Amy) Ling
(74) *Attorney, Agent, or Firm* — DICKINSON WRIGHT RLLP

(57) ABSTRACT

The described embodiments regard latency estimation by a wireless device for a cellular wireless access link. The wireless device determines maximum grant allocations (e.g., maximum transport block size values) for time slots based on channel conditions, monitors grant allocations to the wireless device, and classifies time slots having non-zero grant allocations based on a comparison of the grant allocations to the maximum possible grants to determine traffic bursts. The wireless device measures time periods of time slots with zero grant allocations within traffic bursts to estimate latency values for traffic bursts. The wireless device statistically processes the latency values to generate a composite (e.g., weighted moving average) latency value to compare with a threshold to determine whether to initiate latency mitigation actions.

20 Claims, 7 Drawing Sheets

(51) Int. Cl.
     H04L 43/16          (2022.01)
     H04W 24/08          (2009.01)

(56)                References Cited

U.S. PATENT DOCUMENTS

| | | | |
|---|---|---|---|
| 2018/0077594 | A1 | 3/2018 | He et al. |
| 2018/0092093 | A1 | 3/2018 | Ramaswamy et al. |
| 2018/0278374 | A1* | 9/2018 | Zeng ..................... H04L 1/1896 |
| 2018/0343206 | A1* | 11/2018 | White ..................... H04L 47/11 |
| 2019/0109676 | A1* | 4/2019 | Zhang ................... H04L 1/1812 |
| 2019/0222982 | A1 | 7/2019 | Cao et al. |
| 2021/0360654 | A1 | 11/2021 | Akkarakaran et al. |
| 2021/0377983 | A1* | 12/2021 | Pefkianakis .......... H04W 72/53 |
| 2022/0217577 | A1 | 7/2022 | Pefkianakis et al. |
| 2023/0065594 | A1* | 3/2023 | Chan ..................... H04W 28/10 |
| 2024/0007377 | A1* | 1/2024 | Kannan .............. H04L 43/0864 |

OTHER PUBLICATIONS

Hyunwoo Cho et al., "Discussion on improvement on Scell/SCG setup delay", 3GPP Draft, 3rd Generation Partnership Project (3GPP), Mobile Competence Centre; Sophia-Antipolis Cedex; France; vol. 3GPP RAN 4, no. Online; Apr. 17, 2023-Apr. 26, 2023, Apr. 10, 2023, Retrieved from the Internet: URL:https://www.3gpp.org/ftp/TSG_RAN/WG4_Radio/TSGR4_106bis-e/Docs/R4-2304385.zip, R4-2304385 Discussion on improvement on ScellSCG setup delay. docx [retrieved on Apr. 10, 2023], p. 3.

PCT Patent Application No. PCT/US2024/025133—International Search Report and Written Opinion dated Aug. 14, 2024.

Chilean Patent Application No. 1551-2024—Office Action dated Oct. 14, 2025.

Chilean Patent Application No. 1551-2024—Office Action dated Apr. 9, 2026.

* cited by examiner

100

200

Latency Tracking System Overview

Traffic Burst = Time Period Between The First Active Slot And The Last Active Slot Latency = Time Gap With No Resource Allocation (Busy Slots Only)
Between Two Active Slots Within A Traffic Burst I = Idle Time Slot 236
A = Active Time Slot 230
B = Busy Time Slot 232
LA = Last Active Time Slot 234

500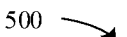

Uplink Latency Tracking Enhancement

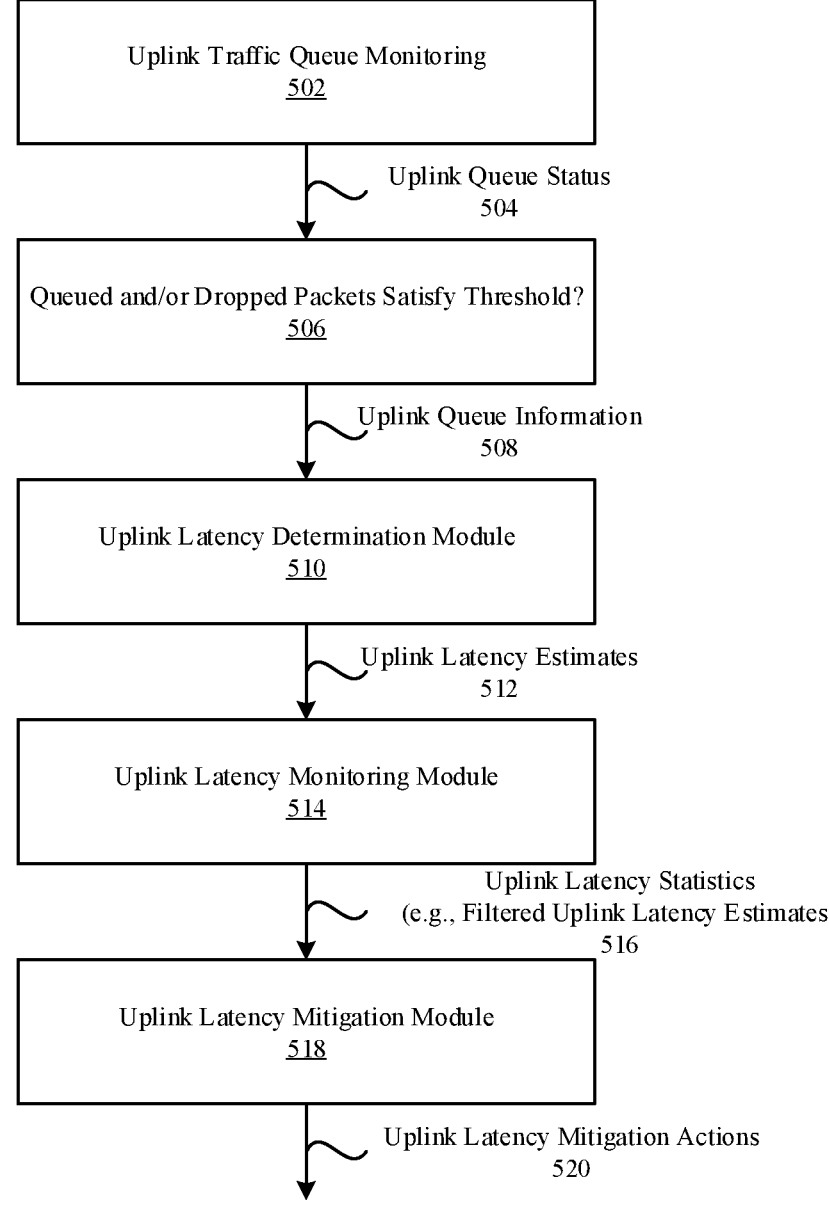

Uplink Traffic Queue Monitoring
502

Uplink Queue Status
504

Queued and/or Dropped Packets Satisfy Threshold?
506

Uplink Queue Information
508

Uplink Latency Determination Module
510

Uplink Latency Estimates
512

Uplink Latency Monitoring Module
514

Uplink Latency Statistics
(e.g., Filtered Uplink Latency Estimates)
516

Uplink Latency Mitigation Module
518

Uplink Latency Mitigation Actions
520

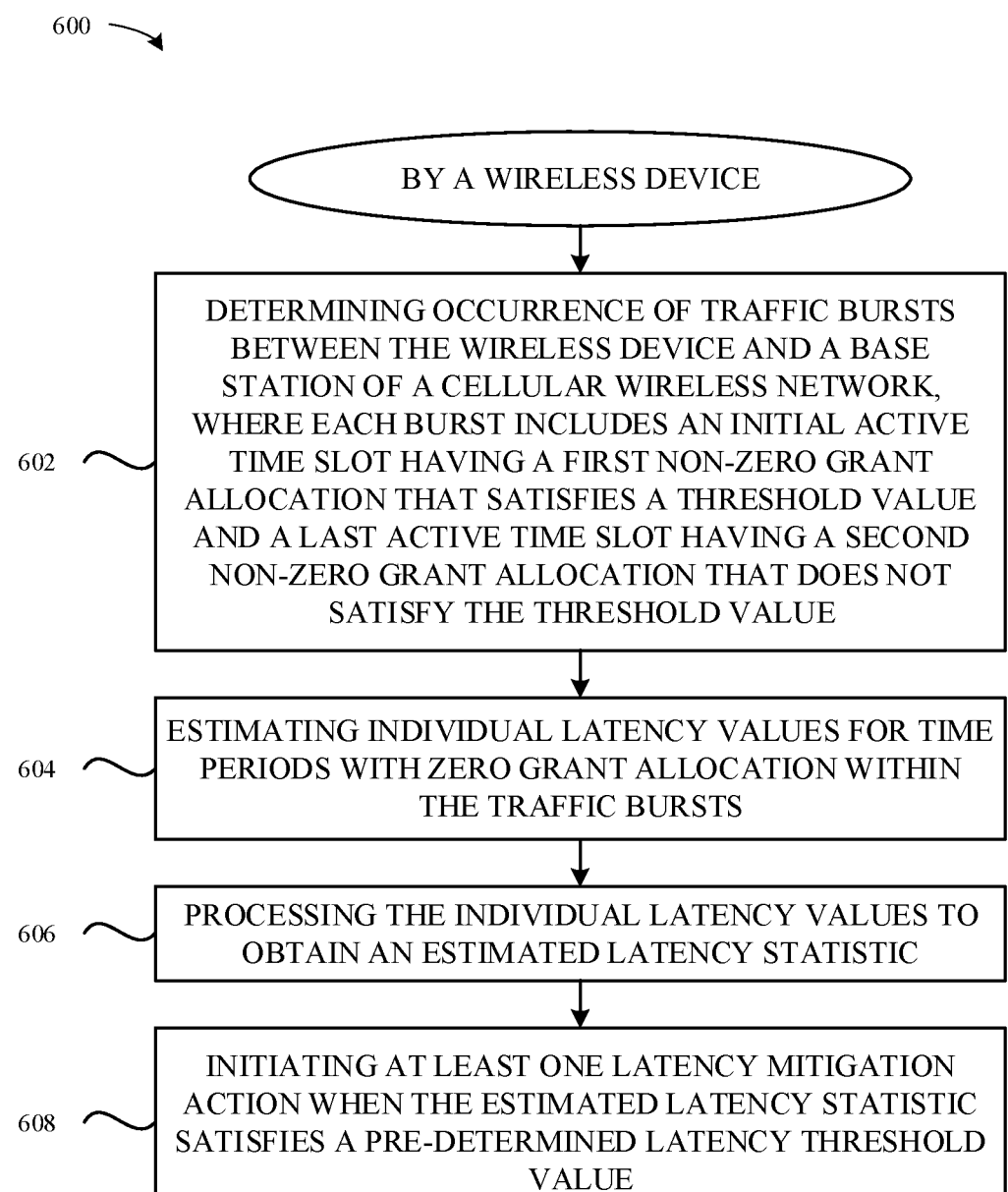

BY A WIRELESS DEVICE

602 — DETERMINING OCCURRENCE OF TRAFFIC BURSTS BETWEEN THE WIRELESS DEVICE AND A BASE STATION OF A CELLULAR WIRELESS NETWORK, WHERE EACH BURST INCLUDES AN INITIAL ACTIVE TIME SLOT HAVING A FIRST NON-ZERO GRANT ALLOCATION THAT SATISFIES A THRESHOLD VALUE AND A LAST ACTIVE TIME SLOT HAVING A SECOND NON-ZERO GRANT ALLOCATION THAT DOES NOT SATISFY THE THRESHOLD VALUE

604 — ESTIMATING INDIVIDUAL LATENCY VALUES FOR TIME PERIODS WITH ZERO GRANT ALLOCATION WITHIN THE TRAFFIC BURSTS

606 — PROCESSING THE INDIVIDUAL LATENCY VALUES TO OBTAIN AN ESTIMATED LATENCY STATISTIC

608 — INITIATING AT LEAST ONE LATENCY MITIGATION ACTION WHEN THE ESTIMATED LATENCY STATISTIC SATISFIES A PRE-DETERMINED LATENCY THRESHOLD VALUE

*FIG. 6*

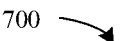
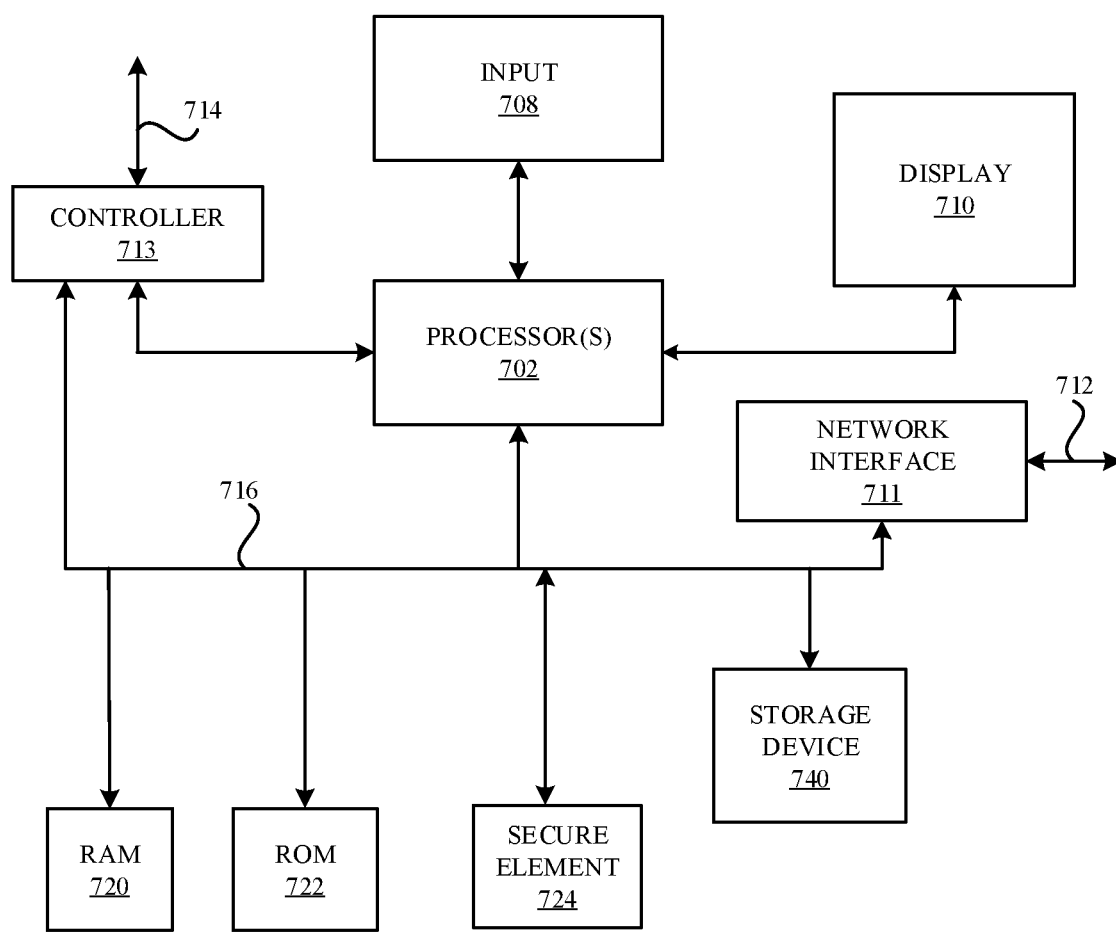
*FIG. 7*

DEVICE-BASED SYSTEM TO ESTIMATE CELLULAR WIRELESS ACCESS NETWORK LATENCY

FIELD

The described embodiments relate to wireless communications, including system, methods, and apparatus for estimating cellular wireless access network latency at a wireless device.

BACKGROUND

Newer generation, fifth generation (5G), cellular wireless networks that implement one or more $3^{rd}$ Generation Partnership Project (3GPP) standards are rapidly being developed and deployed by mobile network operators (MNOs) worldwide. In addition, sixth generation (6G) standards are in active development. The newer cellular wireless networks provide a range of packet-based services, with 5G (and 6G) technology providing increased data throughput and lower latency connections that promise enhanced mobile broadband services for 5G-capable (and 6G-capable) wireless devices. Access to cellular services provided by an MNO can require use to cellular credentials and/or secure processing provided by a secure element (SE), such as a universal integrated circuit card (UICC) or an embedded UICC (eUICC) included in the wireless device.

Wireless devices can be configured to use removable UICCs, that include at least a microprocessor and a read-only memory (ROM), where the ROM is configured to store an MNO profile, also referred to as subscriber identity module (SIM) or SIM profile, which the wireless device can use to register and interact with a cellular wireless network of an MNO to obtain access wireless services. The SIM profile hosts subscriber data, such as a digital identity and one or more cryptographic keys, to allow the wireless device to communicate with a cellular wireless network. Typically, a UICC takes the form of a small removable card, commonly referred to as a SIM card or physical SIM (pSIM) card, which can be inserted into a UICC-receiving bay of a mobile wireless device. In more recent implementations, UICCs are being embedded directly into system boards of wireless devices as eUICCs, which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. The use of multiple SIMs and/or eSIMs is expected to offer flexibility for access to multiple services of multiple wireless networks.

A wireless device can establish a cellular wireless connection to an access network portion of a cellular wireless network, register with the cellular wireless network for access to cellular services, and communicate data packets via the cellular wireless connection. Data traffic incurs latency to travel between different nodes (or endpoints) of a cellular wireless network. The cellular wireless connection between the wireless device and the access network portion of the cellular wireless network incurs latency for data traversing the cellular wireless connection in the downlink direction, from the access network to the wireless device, and in the uplink direction, from the wireless device to the access network. The wireless device can undertake various latency mitigation actions based on the latency incurred via the cellular wireless connection. There exists a need to estimate latency for the cellular wireless connection at the wireless device using information available to the wireless device and without requirement for latency estimates from the cellular wireless network.

SUMMARY

The described embodiments relate to wireless communications, including system, methods, and apparatus for estimating cellular wireless access network latency at a wireless device. Latency is monitored at the wireless device without requiring support for latency estimation from a cellular wireless network to which the wireless device is connected. Latency incurred in the uplink direction from a wireless device to a network entity, e.g., a base station, in an access network portion of a cellular wireless network or in the downlink direction from the base station to the wireless device is estimated at the wireless device based on monitoring grant allocations for time slots for data transmission during periods of high data traffic by the wireless device, e.g., when there is backlogged data traffic in queues from communication to/from the wireless device. The wireless device can monitor channel conditions, dynamically estimate a maximum data grant, e.g., a transport block size $(TBS_{max})$ for a time slot, and compare the actual data grant allocation, e.g., transport block size (TBS) for the time slot allocated to the wireless device to the maximum data grant possible to infer whether there is backlogged data traffic for the wireless device. In some embodiments, the wireless device infers backlogged data traffic when the ratio of the actual TBS to the maximum TBS satisfies, e.g., exceeds, a pre-determined threshold. The wireless device can infer backlogged data traffic for the downlink direction, as the wireless device does not have access to data queue status at the base station. The wireless device can also infer backlogged data traffic for the uplink direction and/or use information from queues in the wireless device to determine when backlogged data traffic exists. Traffic bursts are identified by the wireless device, where a traffic burst includes one or more time slots that have grant allocations satisfying a threshold, referred to as active slots, and ending with a time slot that has a non-zero grant allocation not satisfying the threshold, referred to as a last active slot. The threshold can be based on the maximum data grant possible for the time slot. Each traffic burst starts with an active slot and ends with a last active slot and can include one or more latency time periods within the traffic burst that include one or more time slots with zero grant allocation to the wireless device, referred to as busy slots. Each latency time period of a traffic burst includes one or more consecutive busy slots. Time slots between traffic bursts with zero grant allocation to the wireless device are referred to as idle slots. The wireless device measures durations of latency time periods as individual latency values, processes the measured individual latency values into composite latency statistics, which can include average (mean) latency values during pre-defined measurement time periods, weighted moving average latency values, latency probability distribution characteristics, etc. When one or more composite latency statistics satisfy respective latency thresholds, the wireless device triggers one or more latency mitigation actions using standardized user assistance information (UAI) messages or proprietary messages sent to the base station of the cellular wireless network.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 5 illustrates a block diagram of an overview of another exemplary set of computational modules for an uplink latency tracking system in a wireless device, according to some embodiments.

FIG. 6 illustrate a flow chart of an exemplary method for estimating cellular wireless network latency by a wireless device, according to some embodiments.

FIG. 7 illustrates a block diagram of exemplary elements of a wireless device, according to some embodiments.

DETAILED DESCRIPTION

Figure 1:
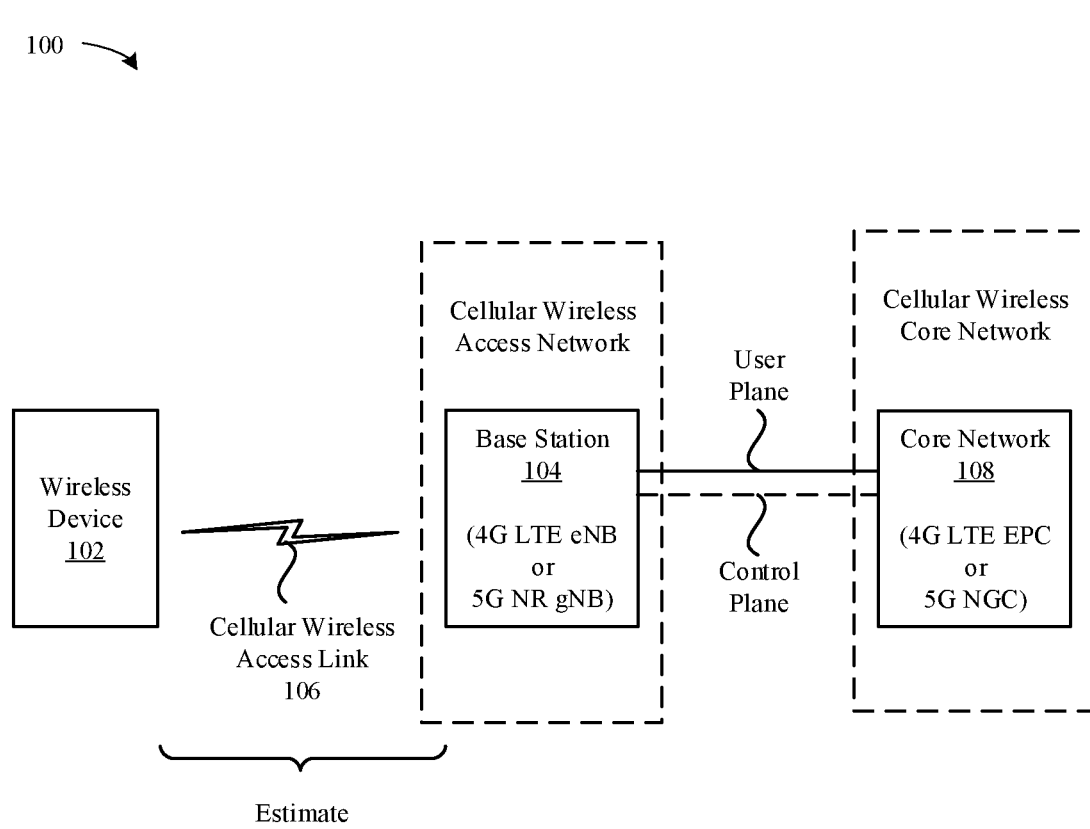
FIG. 1 illustrates a block diagram of different components of an exemplary system configured to implement cellular network latency estimation for a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

The described embodiments relate to wireless communications, including system, methods, and apparatus for estimating cellular wireless access network latency at a wireless device. Latency monitoring can be used by the wireless device to trigger latency mitigation actions, such as changing wireless communication parameters, adjusting data traffic types, selecting between different radio access technologies (RATs), and/or switching to alternative wireless communication systems if available. Latency can impact performance of applications running on the wireless device due to delays in sending and/or receiving data packets for the applications, and latency mitigations can improve performance and therefore user experience.

Data traffic incurs latency to travel between different nodes (or endpoints) of a cellular wireless network. A cellular wireless connection between the wireless device and the access network portion of the cellular wireless network incurs latency for data traversing the cellular wireless connection in the downlink direction, from the access network to the wireless device, and in the uplink direction, from the wireless device to the access network. Latency can be monitored at the wireless device without requiring support for latency estimation from the cellular wireless network to which the wireless device is connected. Latency incurred in the uplink direction, from the wireless device to a network entity in an access network portion of a cellular wireless network, e.g., to a base station also referred to as an enhanced NodeB (eNodeB) for a 4G LTE cellular wireless network or a gNodeB for a 5G new radio (NR) cellular wireless network, or in the downlink direction from the base station to the wireless device, is estimated at the wireless device based on monitoring grant allocations to the wireless device for time slots available for uplink or downlink data transmission.

The wireless device classifies time slots to determine data traffic bursts and identify time periods of halted transmission (for uplink time slots) or reception (for downlink time slots) during the data traffic burst when latency delays are incurred by the wireless device. During periods of high data traffic by the wireless device, e.g., when there is backlogged data traffic in queues for communication to/from the wireless device, latency will be incurred for data packets that can be timely sent/received. The wireless device differentiates between i) time periods with sparse grant allocations that can be attributed to low data rates for applications in use by the wireless device, and ii) time periods of data traffic bursts that include non-contiguous time slots with grant allocations separated by time slots with no grant allocation due to contention for network resources. Latency, also referred to as an inter-grant distance, is measured as a time gap between grants allocated to the wireless device when there is backlogged data traffic in queues. While the wireless device has knowledge of uplink queues for data traffic to be sent to the cellular wireless network, the wireless device does not have direct knowledge of downlink queues for data traffic to be received from the cellular wireless network. Knowledge of uplink queues can be used to determine (and/or confirm) time periods of uplink backlogged data traffic. The wireless device infers data traffic bursts and measures inter-grant distance for the inferred data traffic bursts. The wireless device estimates latency in both downlink and uplink directions using this methodology without requiring support from the cellular wireless network, e.g., no active probing for latency with test packets required.

The wireless device can monitor channel conditions and dynamically estimate a maximum possible data grant allocation, e.g., a transport block size ($TBS_{max}$) value for a time slot, and compare an actual data grant allocation, e.g., a transport block size (TBS) value for the time slot allocated to the wireless device to the maximum data grant possible for the time slot to infer whether there is backlogged data traffic for the wireless device. The $TBS_{max}$ value can be calculated by the wireless device using available communication channel parameters, such as a modulation coding scheme (MCS) value determined from a channel quality indicator (CQI) value, a number of multiple-input multiple-output (MIMO) layers provided by the wireless device, and a maximum number of radio bearers (RBs) supported for a time slot based on a currently radio frequency (RF) bandwidth). In some embodiments, the wireless device infers backlogged data traffic when a ratio of the actual TBS value to the $TBS_{max}$ value satisfies, e.g., exceeds, a pre-determined ratio threshold, e.g., 0.5, which indicates a majority of available resources for a time slot are allocated to the wireless device. The wireless device infers when backlogged data traffic exists for the downlink direction, as the wireless device does not have access to data queue status at the base station. The wireless device can also infer backlogged data traffic for the uplink direction but additional, in some cases, use information for uplink queues in the wireless device to determine when uplink backlogged data traffic exists.

The wireless device identifies traffic bursts by classifying time slots, where a traffic burst includes one or more active time slots that have grant allocations satisfying a threshold, e.g., where the ratio $TBS/TBS_{max}$ for the time slot exceeds a ratio threshold value, e.g., 0.5. A traffic burst starts with an active time slot and ends with a last active time slot that has a non-zero grant allocation that does not satisfy the ratio threshold. Each traffic burst, which starts with an active time slot and ends with a last active time slot, can include one or more latency time periods within the traffic burst that include one or more time slots with zero grant allocation to the wireless device, referred to as busy time slots. Each latency time period of a traffic burst includes one or more consecutive busy time slots. Time slots with zero grant allocation to the wireless device at occur outside of traffic burst are referred to as idle time slots. The wireless device measures a duration of each latency time period of a traffic burst as an individual latency value. The wireless device processes the measured individual latency values into composite latency statistics, which can include average (mean) latency values during pre-defined measurement time periods, weighted moving average latency values, latency probability distribution characteristics, etc. When one or more composite latency statistics satisfy respective latency thresholds, the wireless device can trigger one or more latency mitigation actions, such as by sending standardized user assistance information (UAI) messages or proprietary messages to the base station of the cellular wireless network. Exemplary mitigation actions include changing time slot aggregation, configuring periodic fixed uplink grants, changing connected mode discontinuous reception (cDRX) parameters, blocking select uplink data traffic, switching radio frequency (RF) carriers, switching RF bands, and/or switching RATs, switching wireless communication technology used.

These and other embodiments are discussed below with reference to FIGS. 1 through 7; however, those skilled in the art will readily appreciate that the detailed description given herein with respect to these figures is for explanatory purposes only and should not be construed as limiting.

FIG. 1 illustrates a block diagram 100 of different components of a cellular wireless communication system that includes i) a wireless device 102, which can also be referred to as a mobile wireless device, a cellular wireless device, a wireless communication device, a mobile device, a user equipment (UE), a device, and the like, ii) a base station 104, such as a 4G LTE eNodeB (eNB) or 5G NR gNodeB (gNB), which is a network entity of a cellular wireless access network, and iii) a core network 108, such as a 4G LTE enhanced packet core (EPC) or 5G next generation core (NGC). The wireless device 102 can represent a mobile computing device (e.g., an iPhone®, an iPad®, or an Apple Watch® by Apple®). Applications resident on the wireless device 102 can advantageously access services of a cellular wireless network using 4G LTE connections or 5G connections via the base station 104. Data traffic for applications on the wireless device 102 encounter delay, referred to as latency, to reach (or be received from) target endpoints. Each link between distinct nodes of a connection can add latency. In this application, a wireless device 102 estimates network induced latency over a cellular wireless access link 106 between the wireless device 102 and the base station 104. Latency in the uplink direction, from the wireless device 102 to the base station 104 via the cellular wireless access link 106, and latency in the downlink direction, from the base station 104 to the wireless device 102, can be estimated separately. Additional latency due to connections between network nodes beyond the cellular wireless access network's base station 104 are not considered herein. Estimating latency provides the wireless device 102 information to trigger latency mitigation actions, such as changing cellular wireless communication parameters in use, re-selecting to a different radio access technology (RAT), and/or moving to non-cellular wireless access based on performance required for applications executing on the wireless device 102.

Figure 2:
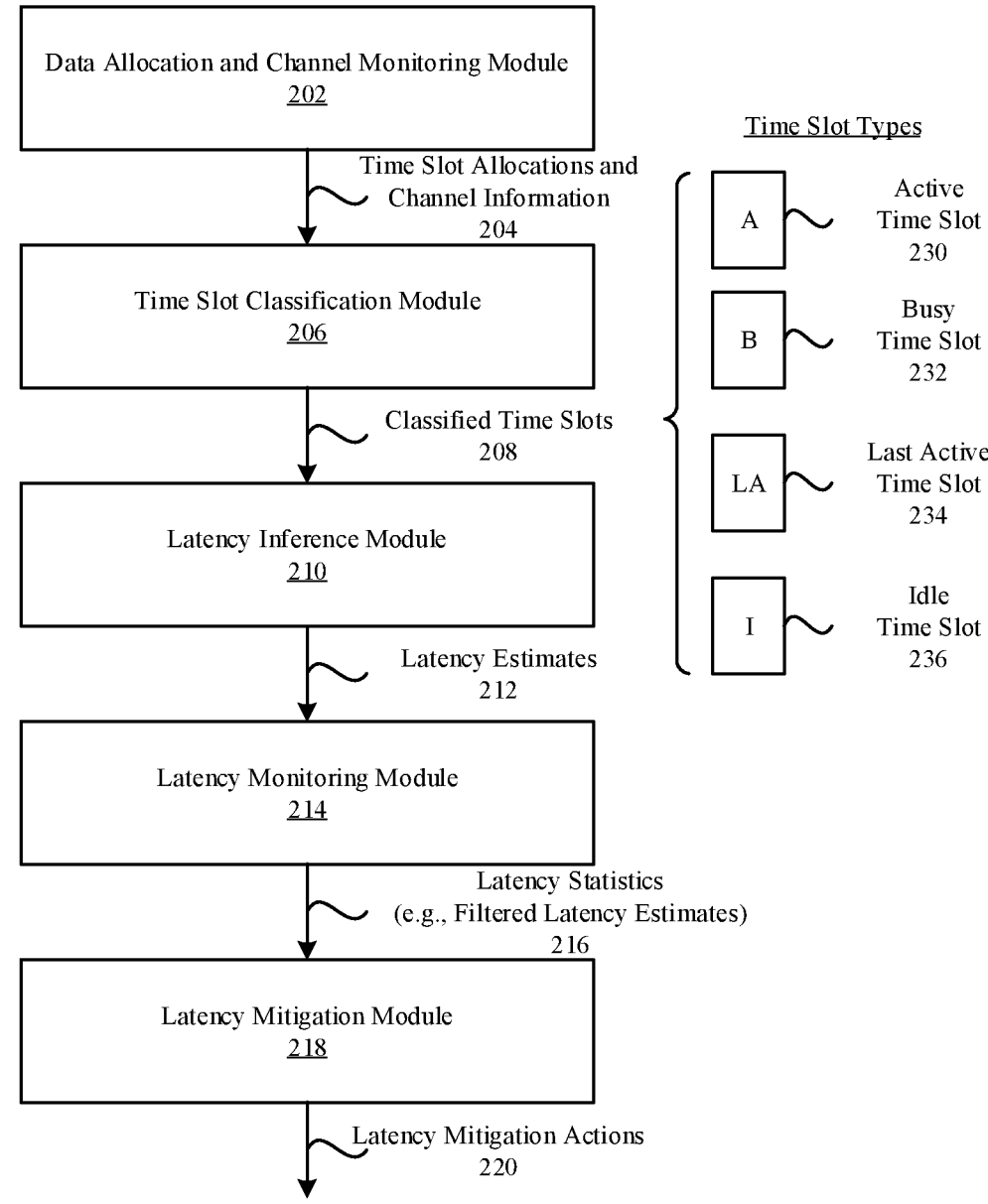
FIG. 2 illustrates a block diagram of an overview of an exemplary set of computational modules for a latency tracking system in a wireless device, according to some embodiments.

FIG. 2 illustrates a block diagram 200 of an overview of an exemplary set of computational modules of a latency tracking system for a wireless device 102. The wireless device 102 can estimate latency in both a downlink (DL) direction and an uplink (UL) direction on the cellular wireless access link 106 between the wireless device 102 and a base station 104 in an access network portion of a cellular wireless network. The latency tracking system described herein executes at the wireless device 102 and does not require support from the cellular wireless network to estimate latency for the cellular wireless access link 106 between the wireless device 102 and a base station 104 to which the wireless device 102 is connected and communicating packet data. The wireless device 102 differentiates between sparse grant allocations from the base station 104 due to relatively lower data rates for applications executing on the wireless device 102 and time periods of relatively higher data rates with backlogged data traffic and gaps in grant allocations to the wireless device 102, which can be attributed to insufficient network resources being available to the wireless device 102, such as during periods of network congestion. The wireless device 102 monitors packet data traffic, identifies traffic bursts of multiple time slots with data traffic, and measures time periods within traffic bursts during which no data traffic transmission (for uplink latency) or reception (for downlink latency) occurs.

The latency tracking system includes a data allocation and channel monitoring module 202 that monitors communication channel characteristics (key performance indicators), such as transport block size (TBS) values, modulation coding scheme (MCS) values, multiple-input multiple-output (MIMO) layers, radio frequency (RF) bandwidth values, channel quality indicator (CQI) values, packet queue status, and/or block error rate (BLER) values, for the cellular wireless access link 106 between the wireless device 102 and the base station 104. The data allocation and channel monitoring module 202 also monitors data grants allocated by the base station 104 to the wireless device 102 in time slots available for downlink transmission, to the wireless device 102 to the base station 104, and for uplink transmission, from the wireless device 102 to the base station 104. The data allocation and channel monitoring module 202 can provide time slot grant allocation indications and communication channel characteristic information 204 to a time slot classification module 206, which can characterize time slots based on the provided time slot allocations and communication channel characteristic information 204.

The time slot classification module 206 characterizes time slots and identifies traffic bursts of packet data transmission and reception for the wireless device 102 when there is backlogged data traffic for the wireless device 102. The time slot classification module 206 characterizes a time slot as an active time slot 230, when the time slot has a non-zero grant allocation that satisfies a threshold value. The threshold value can be determined by the wireless device 102 based on the communication channel characteristics for the time slot. In some embodiments, the time slot classification module 206 determines an amount of resources available for the time slot and classifies the time slot as an active time slot 230 when a majority of available resources for the time slot are allocated to the wireless device 102. In some embodiments, the time slot classification module 206 calculates a maximum transport block size (TBS) value for the time slot based on the communication channel characteristics and compares a TBS value of a grant allocation for the time slot to the wireless device 102 to the maximum TBS value to determine whether to characterize the time slot as an active time slot 230. In some embodiments, the time slot classification module 206 calculates a ratio of i) a TBS value of a grant allocation to the wireless device 102 for the time slot to ii) a calculated maximum TBS value for the time slot and compares the calculated ratio to a ratio threshold value to determine whether to classify the time slot as an active time slot 230. In some embodiments, the time slot classification module 206 classifies the time slot as an active time slot 230 when the calculated ratio satisfies, e.g., exceeds, the ratio threshold value. In some embodiments, the ratio threshold value is at least one-half and less than one.

The time slot classification module 206 characterizes a time slot as a last active time slot 234, when the time slot has a non-zero grant allocation that does not satisfy the threshold value. In some embodiments, the time slot classification module 206 characterizes the time slot as a last active time slot 234 when less than a majority of available resources for the time slot are allocated to the wireless device 102. In some embodiments, the time slot classification module 206 characterizes the time slot as a last active time slot when the calculated ratio of i) the TBS value of a grant allocation to the wireless device 102 for the time slot to ii) the calculated maximum TBS value ($TBS_{max}$) for the time slot does not satisfy, e.g., does not exceed, the ratio threshold value. For example, with a ratio threshold value T, the time slot classification module 206 characterizes a time slot as an active time slot 230 when $TBS/TBS_{max}>T$ and as a last active time slot 234 when $TBS/TBS_{max}\leq T$. $TBS_{max}$ can be calculated based on channel quality characteristics (e.g., inferred from CQI values and corresponding MCS values, maximum RF bandwidth, as well as additional device capabilities, such as number of MIMO layers available, etc.). The ratio threshold value T can be configured as a non-zero value in the interval (0,1].

The time slot classification module 206 characterizes a time slot as a busy time slot 232, when the time slot has a zero grant allocation while there is downlink data traffic or uplink data traffic queued for the wireless device 102. As the wireless device 102 does not have access to downlink queue information for the base station 104, the wireless device 102 infers that a time slot with a zero grant allocation that occurs within a traffic burst that includes at least one active time slot 230 and a last active time slot 234 to be a busy time slot 232, where the base station 104 grants available resources for the time slot to other wireless devices 102.

The time slot classification module 206 characterizes a time slot as an idle time slot 236, when the time slot has a zero grant allocation and there is no downlink data traffic or uplink data traffic queued for the wireless device 102. The wireless device 102 infers that a time slot with a zero grant allocation that occurs between traffic bursts to be an idle time slot 236.

The time slot classification module 206 provides the classified time slots 208 to a latency inference module 210 which determines individual latency estimates 212 for time periods of busy time slots 232 within traffic bursts. A traffic burst includes at least a first active time slot 230 and a last active time slot 234. A traffic burst can include multiple active time slots 230. A traffic burst can include one or more busy time slots 232, which can be used to estimate latency for backlogged data traffic that is not able to be communicated to or from the wireless device 102 during the busy time slots 232. Traffic bursts can occur back-to-back or can be separated by one or more intervening idle time slots 236. The wireless device 102 does not attribute latency to time periods of idle time slots 236 between traffic bursts. The wireless device infers latency from time periods of busy time slots 232 that occur within traffic bursts. Latency can be determined as a time gap (time duration) between two active time slots 230 or between an active time slot 230 and a last active time slot 234 within a traffic burst and reflects a waiting time for the wireless device 102 to obtain a grant allocation for transmission or reception of data traffic. The latency inference module 210 can measure time periods of one or more busy time slots 232 within traffic bursts to generate latency estimates 212 that are provided to a latency monitoring module 214. In some embodiments, the latency estimates 212 output by the latency inference module 210 are time durations for each time period of one or more consecutive busy time slots 232 within traffic bursts. In some embodiments, the latency inference module 210 averages together individual latency estimates for individual time periods of one or more consecutive busy time slots 232 within a traffic burst and outputs a single averaged latency estimate 212 for each traffic burst.

The latency monitoring module 214 processes the individual latency estimates 212 to generate a set of one or more latency statistics 216. For example, the latency statistics 216 can include filtered latency estimates such as a moving average value for the latency estimates 212 and/or a latency probability distribution. The latency monitoring module 214 provides the latency statistics 216 to a latency mitigation module 218 that can trigger one or more latency mitigation actions 220 based on the latency statistics 216. Exemplary latency mitigation actions 220 include changing time slot aggregation parameters, configuring a regular (e.g., periodic) grant allocation for uplink transmission, changing settings (or preferences) for connected mode discontinuous reception (cDRX), adjusting settings (or preferences) for user equipment (UE) assistance information (UAI) release procedures, changing random access channel (RACH) procedures, and/or blocking select data traffic, e.g., background data traffic, to prioritize other data traffic, e.g., foreground data traffic. Additional exemplary mitigation actions 220 include switching RATs or prioritization for RAT use by the wireless device 102 and/or switching between cellular wireless and non-cellular wireless connections to improve data traffic throughput performance for the wireless device 102.

In some embodiments, the wireless device 102 sends one or more standardized UAI messages or proprietary messages to the base station 104 of the cellular wireless network to mitigate latency incurred by network congestion. A UAI message informs the base station 104 of various internal statuses of the wireless device 102 and allows the base station 104 to assign and/or control resources for the wireless device 102 based on the information indicated by the statuses in the UAI message. In some embodiments, a UAI message includes capability information for the wireless device, such as maximum settings, which can change dynamically over time. In some embodiments the wireless device 102 sends proprietary messages to the base station 104 to enable or disable various features to assist with improving latency for data packet communication with the wireless device 102.

Figure 3:
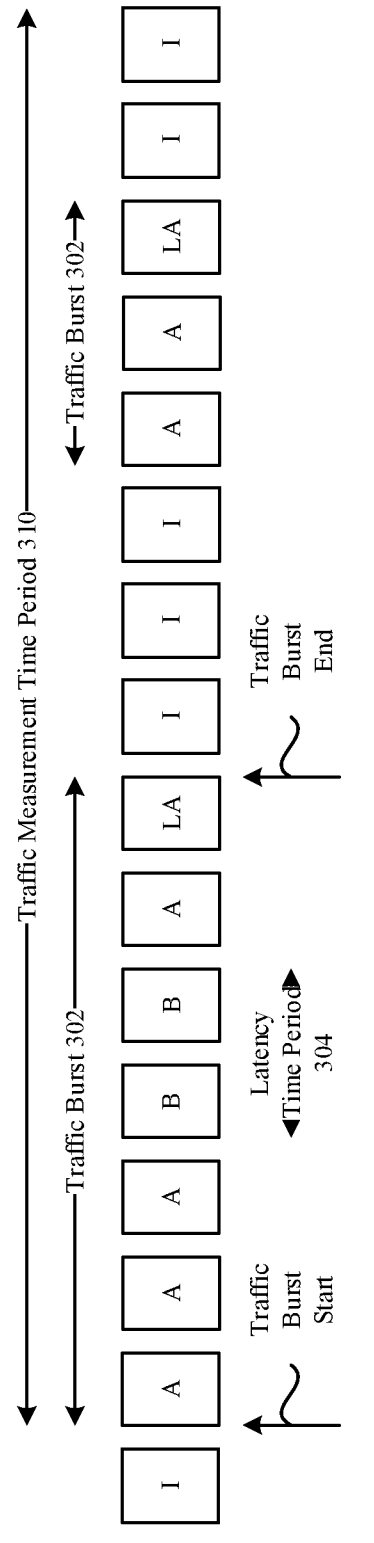
FIG. 3 illustrates a diagram of an example of a sequence of time slots with applicable classifications, according to some embodiments.

FIG. 3 illustrates a diagram 300 of an example of a sequence of time slots over a traffic measurement time period 310 with the time slots identified with applicable classifications, e.g., by the time slot classification module 206. The traffic measurement time period 310 includes two traffic bursts 302 separated by several idle time slots 236. Each traffic burst 302 begins with an initial active time slot 230 and ends with a last active time slot 234. The first traffic burst 302 begins after an idle time slot 236 and includes the initial active time slot 230 followed by two additional active time slots 230 and then a latency time period 304 that includes two busy time slots 232 followed by an additional active time slot 230 and ending with the last active time slot 234. The second traffic burst includes two active time slots 230 followed by a last active time slot 234 with no busy time slots 232. The latency inference module 210 can determine and output a latency estimate 212 corresponding to the latency time period 304 for the first traffic burst 302. The latency inference module 210 can determine there are no latency estimates 212 to output (or in some cases, output a latency estimate with a value equal to a time duration of a single time slot) for the second traffic burst 302. The idle time slots 236 between traffic bursts 302 will not result in any latency estimates 212, as only traffic bursts are considered for determining latency estimates 212. In some cases, a traffic burst 302 can include multiple latency time periods 304 (not shown) and result in multiple latency estimates 212 corresponding to the multiple latency time periods 304 of the traffic burst 302. In some cases, the latency inference module 210 outputs multiple latency estimates 212 for a traffic burst that includes multiple latency time periods 304. In some cases, the latency inference module 210 outputs a single combined (e.g., averaged) latency estimate 212 for a traffic burst 302 that includes multiple latency time periods 304.

Figure 4:
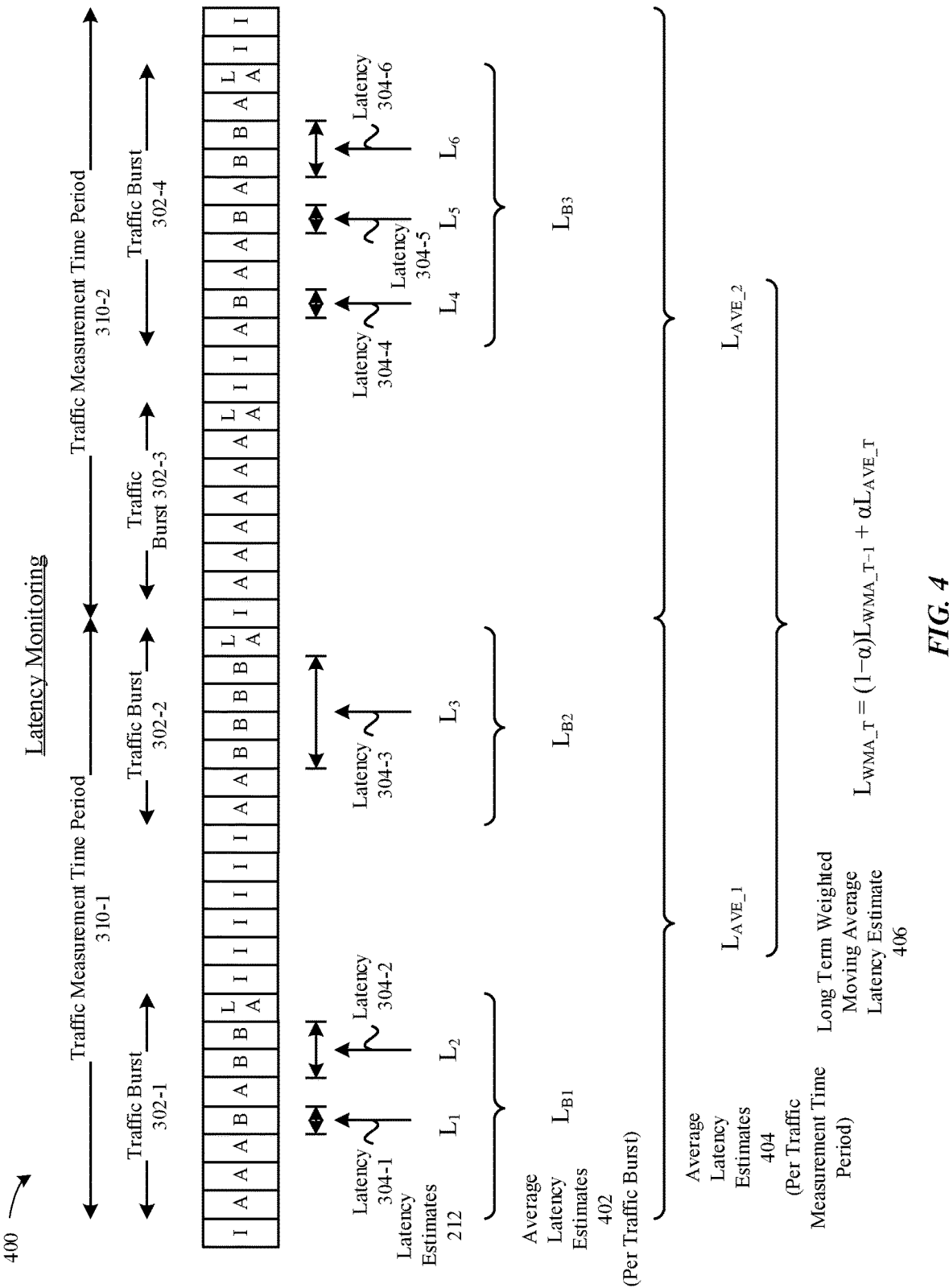
FIG. 4 illustrates a diagram of an example of latency monitoring based on classification of time slots by a wireless device, according to some embodiments.

FIG. 4 illustrates a diagram 400 of an example of latency monitoring based on classification of time slots by a wireless device 102. A time slot classification module 206 classifies a sequence of time slots based on grant allocations to the wireless device 102 for the time slots and on a maximum grant allocation for the time slots based on communication channel characteristics for the cellular wireless access link 106 between the wireless device 102 and a base station 104. A latency inference module 210 identifies traffic bursts 302 based on the time slot classification, identifies latency time periods 304 within traffic bursts 302, and determines latency estimates 212 for the latency time periods 304. The latency estimates 212 can be averaged over a traffic burst 302 resulting an average latency estimate 402 for each traffic burst 302 that includes latency time periods 304. In some cases, a traffic burst 302 without a latency time period 304 does not result in a latency estimate 212 for the traffic burst 302. In some embodiments, a traffic burst 302 without a latency time period 304 results in a latency estimate 212 equal to a time duration of a single time slot for the traffic burst 302. The average latency estimates 402 for each traffic measurement time period 310 can be further averaged together to produce an average latency estimate 404 for each traffic measurement time period 310. The average latency estimates 404 for the traffic measurement time periods 310 can be processed to produce a long term weighted moving average latency estimate 406. The wireless device 102 can use the long term weighted moving average latency estimate 406 (or another statistical processing of the latency estimates 212) to determine whether to initiate one or more latency mitigation actions 220.

For the example shown in FIG. 4, a first traffic measurement time period 310-1 includes a first traffic burst 302-1 that includes two individual latency time periods 304, a first latency time period 304-1 that spans a single busy time slot 232 resulting in a latency estimate 212 with a latency value $L_1$, and a second latency time period 304-2 that spans two busy time slots 232 resulting in a latency estimate 212 with a latency value $L_2$. The two latency estimates 212 for the first traffic burst 302-1 can be combined to produce an average latency estimate 402 having an average latency value $L_{B1}$ for the first traffic burst 302-1. The first traffic measurement time period 310-1 also includes a second traffic burst 302-2 that includes a single latency time period 304-3 that spans four busy time slots 232 resulting in a latency estimate 212 having a latency value $L_3$, which is also an average latency estimate 402 value $L_{B2}$ for the traffic burst 302-2. The average latency estimates 402 for the first traffic measurement time period 310-1 can be averaged together to produce an average latency estimate 404 with a value of $L_{AVE\_1}$ for the first traffic measurement time period 310-1. The example of FIG. 4 further includes a second traffic measurement time period 310-2 having a first traffic burst 302-3 with no latency time periods 304 and a second traffic burst 302-4 with three latency time periods 302-4, 302-5, and 302-6 resulting in latency estimates 212 having values of $L_4$, $L_5$, and $L_6$, which can be averaged together to form the average latency estimate 402 with a value of $L_{B3}$ for the second traffic burst 302-4. In some embodiments, the first traffic burst 302-3, with no latency time periods, results in a latency estimate 212 having a value equal to a time duration of a single time slot. The latency estimates 212 for the traffic measurement time period 310-2 can be averaged together to produce an average latency estimate 402 with a value $L_{AVE\_2}$ for the second traffic measurement time period 310-2. The average latency estimates 404 for each traffic measurement time period 310 can be combined using a weighted averaging formula with a weighting factor a to produce a weighted moving average latency estimate 406.

$$L_{WMA\_T} = (1-\alpha)L_{WMA\_T\text{-}1} + \alpha L_{AVE\_T}$$

In an exemplary embodiment, the weighting factor is set to $\alpha = \frac{1}{8}$. In some embodiments, each traffic measurement time period 310 spans two seconds. In some embodiments, the traffic measurement time period 310 is configurable by software/firmware in the wireless device 102. In some embodiments, a latency mitigation module 218 triggers one or more latency mitigation actions 220 when the weighted moving average latency estimate 406 exceeds a pre-determined latency threshold value. In some embodiments, the wireless device 102 maintains a history of the weighted moving average latency estimates 406 and estimates a latency probability distribution, e.g., a median value, a standard deviation, a maximum value, etc. Exemplary latency mitigation actions 220 include changing time slot aggregation parameters, configuring a regular (e.g., periodic) grant allocation for uplink transmission, changing settings (or preferences) for connected mode discontinuous reception (cDRX), adjusting settings (or preferences) for user assistance information (UAI) release procedures, changing random access channel (RACH) procedures, and/or blocking select data traffic, e.g., background data traffic, to prioritize other data traffic, e.g., foreground data traffic. Additional exemplary mitigation actions 220 include switching RATs or prioritization for RAT use by the wireless device 102 and/or switching between cellular wireless and non-cellular wireless connections to improve data traffic throughput performance for the wireless device 102.

In some embodiments, the wireless device 102 measures time gaps between grant allocations to estimate latency when a high application data rate occurs, which can imply an amount of backlogged traffic exists. Application data rates can be measured, in some cases, by monitoring TBS values. In some embodiments, the wireless device 102 measures time gaps between grant allocations to estimate latency when a high block error rate (BLER) occurs, which can imply multiple retransmissions are required and therefore there is backlogged traffic for the wireless device 102. In some embodiments, the wireless device 102 measures time gaps inside traffic bursts and uses TBS values and/or BLER values to confirm whether there is backlogged traffic and therefore latency can be inferred from the measured time gaps. In some embodiments, the wireless device 102 monitors a category associated with an application executing on the wireless device, such as gaming, augmented reality (AR), virtual reality (VR), voice over IP (VoIP), video streaming, audio streaming, media streaming, etc., and for certain application categories, the wireless device 102 measures time gaps between grant allocations to the wireless device 102 to estimate latency.

FIG. 5 illustrates a diagram 500 of an overview of another exemplary set of computational modules for an uplink latency tracking system in a wireless device 102. Latency monitoring in the downlink direction can use a traffic burst identification system at the wireless device as described herein to determine when there is backlogged downlink traffic queued at a base station 104 for transmission to the wireless device 102, because the wireless device 102 does not have access to queue status of the base station 104 for the data traffic for the wireless device 102. In some embodiments, the wireless device 102 supplements traffic burst identification with knowledge of uplink queues maintained at the wireless device 102 to monitor and estimate latency. An uplink traffic queue monitoring module 502 can provide an uplink queue status 504, which can be used to determine, at 506, whether there are queued (yet to be transmitted) uplink data packets and/or dropped data packets resulting in latency. In some embodiments, the wireless device 102 monitors uplink queues at the packet data convergence protocol (PDCP) layer. Uplink queue information 508 can be provided to an uplink latency determination module 510 that generates uplink latency estimates 512. An uplink latency monitoring module 514 can process the uplink latency estimates 512 to produce as set of uplink latency statistics 516, e.g., filtered uplink latency estimates, that can be provided to an uplink latency mitigation module 518 that uses the uplink latency statistics 516 to determine whether to perform (or recommend) one or more uplink mitigation actions 520. In some embodiments, the number of queued and/or dropped uplink data packets are monitored and compared to a configurable queue threshold value. When the number of queued and/or dropped uplink data packets satisfies (e.g., exceeds) the queue threshold value, an uplink latency estimate can be generated. In some embodiments, latency estimates are generated by monitoring time durations between uplink grants when the queue threshold value is satisfied. In some embodiments, latency estimates are generated by monitoring time durations between uplink grants when a block error rate (BLER) satisfies a BLER threshold value. In some embodiments, the wireless device 102 monitors buffer status report (BSR) requests to identify when there are backlogged data packets and generates latency estimates by monitoring time durations between uplink grants when a number of BSR requests satisfies (e.g., exceeds) a BSR threshold value.

FIG. 6 illustrates a flow chart 600 of an exemplary method for cellular wireless network latency estimation performed by a wireless device 102. At 602, the wireless device 102 determines occurrence of traffic bursts 302 on a cellular wireless access link 106 between the wireless device 102 and a base station 104, each traffic burst 302 including an initial active time slot 230 having a first non-zero grant allocation that satisfies a threshold value and a last active time slot 234 having a second non-zero grant allocation that does not satisfy the threshold value. At 604, the wireless device 102 estimates individual latency values 212 for time periods with zero grant allocation within the traffic bursts 302. At 606, the wireless device 102 processes the individual latency values 212 to obtain an estimated latency statistic 216. At 608, the wireless device 102 initiates at least one latency mitigation action 220 when the estimated latency statistic 216 satisfies a pre-determined latency threshold value.

In some embodiments, the wireless device 102 determines occurrence of traffic bursts 302 by classifying time slots having a non-zero grant allocation as an active time slot 230 when a majority of available resources for the time slot are allocated in the non-zero grant allocation to the wireless device 102, and as a last active time slot 234 when less than a majority of available resources for the time slot are allocated to the wireless device. In some embodiments, the method further includes the wireless device 102: i) calculating a maximum transport block size (TBS$_{max}$) value for each time slot based on communication channel characteristics; and ii) determining the majority of available resources for the time slot are allocated in the non-zero grant allocation to the wireless device 102 when a ratio of a transport block size (TBS) of the non-zero grant allocation to the TBS$_{max}$ value exceeds a ratio threshold value. In some embodiments, the ratio threshold value is at least one-half and less than one. In some embodiments, the wireless device 102 determines occurrence of the traffic bursts 302 by classifying a time slot having a zero grant allocation to be a busy time slot 232 when occurring within a traffic burst 302 and as an idle time slot 236 when occurring between traffic bursts 302. In some embodiments, individual latency values of a traffic burst 302 equal a time duration of one or more consecutive busy time slots 232 within the traffic burst 302. In some embodiments, the estimated latency statistic 216 includes a weighted moving average of the individual latency values. In some embodiments, the estimated latency statistic 216 satisfies the pre-determined latency threshold value when the weighted moving average of the individual latency values exceeds the pre-determined latency threshold value during a traffic measurement time period 310. In some embodiments, the wireless device 102 initiates the at least one latency mitigation action by sending one or more standardized user assistance information (UAI) messages to the base station 104 to cause the base station 104 to increase data grant allocations to the wireless device 102. In some embodiments, the wireless device 102 initiates the at least one latency mitigation action by sending one or more proprietary messages to the base station 104 to cause the base station 104 to increase data grant allocations to the wireless device 102. In some embodiments, the wireless device 102 measures latency values for time periods with zero grant allocation when an aggregate data rate for applications executing on the wireless device 102 exceeds an application data rate threshold value. In some embodiments, the wireless device 102 measures latency values for time periods with zero grant allocation when a block error rate (BLER) for communication via the cellular wireless access link 106 exceeds a BLER threshold value. In some embodiments, the wireless device 102 measures uplink latency values for time periods with zero grant allocation when an amount queued uplink packets exceeds a configurable queued packet threshold. In some embodiments, the wireless device 102 measures uplink latency values for time periods with zero grant allocation when an amount of dropped uplink packets exceeds a configurable dropped packet threshold.

Representative Exemplary Apparatus

FIG. 7 illustrates in block diagram format an exemplary computing device 700 that can be used to implement the various components and techniques described herein, according to some embodiments. In particular, the detailed view of the exemplary computing device 700 illustrates various components that can be included in the wireless device 102. As shown in FIG. 7, the computing device 700 can include one or more processors 702 that represent microprocessors or controllers for controlling the overall operation of computing device 700 and/or particular functions of the computing device 700, e.g., an applications processor, a baseband processor, a power control processor, etc. In some embodiments, the computing device 700 can also include a user input device 708 that allows a user of the computing device 700 to interact with the computing device 700. For example, in some embodiments, the user input device 708 can take a variety of forms, such as a button, keypad, dial, touch screen, audio input interface, visual/image capture input interface, input in the form of sensor data, etc. In some embodiments, the computing device 700 can include a display 710 (screen display) that can be controlled by the processor(s) 702 to display information to the user (for example, information relating to incoming, outgoing, or active communication sessions). A data bus 716 can facilitate data transfer between at least a storage device 740, the processor(s) 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband component. The computing device 700 can also include a secure element 724. The secure element 724 can include an eUICC and/or one or more UICCs.

The computing device 700 also includes a storage device 740, which can include a single storage or a plurality of storages (e.g., hard drives and/or solid-state drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

Wireless Terminology

In accordance with various embodiments described herein, the terms "wireless communication device," "wireless device," "mobile device," "mobile station," "mobile wireless device," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near-field communication (NFC), a cellular wireless network, a fourth generation (4G) LTE, LTE Advanced (LTE-A), 5G, and/or 6G or other present or future developed advanced cellular wireless networks.

The wireless device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless devices that are also capable of communicating via different radio access technologies (RATs). In these scenarios, a multi-mode user equipment (UE) can be configured to prefer attachment to a 5G wireless network offering faster data rate throughput, as compared to other 4G LTE legacy networks offering lower data rate throughputs. For instance, in some implementations, a multi-mode UE may be configured to fall back to a 4G LTE network or a 3G legacy network, e.g., an Evolved High Speed Packet Access (HSPA+) network or a Code Division Multiple Access (CDMA) 2000 Evolution-Data Only (EV-DO) network, when 5G wireless networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for latency estimation of a cellular wireless access link between a wireless device and a base station of a cellular wireless network, the method comprising:
    by the wireless device:
        determining occurrence of a traffic burst between the wireless device and the base station, the traffic burst comprising an initial active time slot having a first non-zero grant allocation that satisfies a threshold value and a last active time slot having a second non-zero grant allocation that does not satisfy the threshold value;
        estimating an individual latency value for a time period with zero grant allocation within the traffic burst;
        processing the individual latency value to obtain an estimated latency statistic; and
        initiating at least one latency mitigation action when the estimated latency statistic satisfies a pre-determined latency threshold value.

2. The method of claim 1, wherein determining occurrence of the traffic burst comprises:
    by the wireless device:
        for each time slot having a non-zero grant allocation to the wireless device, classifying the time slot to be:
            i) an active time slot when a majority of available resources for the time slot are allocated in the non-zero grant allocation to the wireless device; and
            ii) a last active time slot when less than the majority of available resources for the time slot are allocated to the wireless device.

3. The method of claim 2, further comprising:
    by the wireless device:
        calculating a maximum transport block size ($TBS_{max}$) value for each time slot based on one or more communication channel characteristics; and
        determining the majority of available resources for the time slot are allocated in the non-zero grant allocation to the wireless device when a ratio of a transport block size (TBS) of the non-zero grant allocation to the $TBS_{max}$ value exceeds a ratio threshold value.

4. The method of claim 3, wherein the ratio threshold value is at least one-half and less than one.

5. The method of claim 2, wherein determining occurrence of the traffic burst further comprises:
    by the wireless device:
        for each time slot having a zero grant allocation to the wireless device, classifying the time slot to be:
            i) a busy time slot when occurring within a traffic burst; and
            ii) an idle time slot when occurring between traffic bursts.

6. The method of claim 5, wherein the individual latency value of the traffic burst equals a time duration of one or more consecutive busy time slots within the traffic burst.

7. The method of claim 1, wherein the estimated latency statistic comprises a weighted moving average of two or more individual latency values.

8. The method of claim 7, wherein the estimated latency statistic satisfies the pre-determined latency threshold value when the weighted moving average exceeds the pre-determined latency threshold value during a traffic measurement time period.

9. The method of claim 1, wherein initiating the at least one latency mitigation action comprises:
    by the wireless device:
        sending one or more standardized user assistance information (UAI) messages to the base station to cause the base station to increase data grant allocations to the wireless device.

10. The method of claim 1, wherein initiating the at least one latency mitigation action comprises:
    by the wireless device:
        sending one or more proprietary messages to the base station to cause the base station to increase data grant allocations to the wireless device.

11. The method of claim 1, further comprising:
    by the wireless device:
        measuring latency values for time periods with zero grant allocation when an aggregate data rate for one or more applications executing on the wireless device exceeds an application data rate threshold value.

12. The method of claim 1, further comprising:
    by the wireless device:
        measuring latency values for time periods with zero grant allocation when a block error rate (BLER) for communication via the cellular wireless access link exceeds a BLER threshold value.

13. The method of claim 1, further comprising:
    by the wireless device:
        measuring uplink latency values for time periods with zero grant allocation when an amount queued uplink packets exceeds a configurable queued packet threshold.

14. The method of claim 1, further comprising:

by the wireless device:

measuring uplink latency values for time periods with zero grant allocation when an amount of dropped uplink packets exceeds a configurable dropped packet threshold.

15. A wireless device configured for latency estimation of a cellular wireless access link between the wireless device and a base station of a cellular wireless network, the wireless device comprising:

one or more antennas; and a baseband processor communicatively coupled to the one or more antennas and a memory storing instructions that when executed configure the wireless device to:

determine occurrence of a traffic burst between the wireless device and the base station, the traffic burst comprising an initial active time slot having a first non-zero grant allocation that satisfies a threshold value and a last active time slot having a second non-zero grant allocation that does not satisfy the threshold value;

estimating an individual latency value for a time period with zero grant allocation within the traffic burst;

processing the individual latency value to obtain an estimated latency statistic; and initiating at least one latency mitigation action when the estimated latency statistic satisfies a pre-determined latency threshold value.

16. The wireless device of claim 15, wherein the wireless device is configured to determine occurrence of the traffic burst by:

for each time slot having a non-zero grant allocation to the wireless device, classifying the time slot to be:

i) an active time slot when a majority of available resources for the time slot are allocated in the non-zero grant allocation to the wireless device; and ii) a last active time slot when less than the majority of available resources for the time slot are allocated to the wireless device.

17. The wireless device of claim 16, wherein the wireless device is further configured to determine occurrence of the traffic burst by:

for each time slot having a zero grant allocation to the wireless device, classifying the time slot to be:

i) a busy time slot when occurring within a traffic burst; and ii) an idle time slot when occurring between traffic bursts.

18. The wireless device of claim 16, wherein the wireless device is further configured to:

calculate a maximum transport block size (TB Smax) value for each time slot based on one or more communication channel characteristics; and determine the majority of available resources for the time slot are allocated in the non-zero grant allocation to the wireless device when a ratio of a transport block size (TBS) of the non-zero grant to the TB Smax value exceeds a ratio threshold value.

19. The wireless device of claim 15, wherein:

the estimated latency statistic comprises a weighted moving average of two or more individual latency values; and the estimated latency statistic satisfies the pre-determined latency threshold value when the weighted moving average exceeds the pre-determined latency threshold value during a measurement time period.

20. A non-transitory computer-readable medium storing instructions for latency estimation of a cellular wireless access link between a wireless device and a base station of a cellular wireless network, the instructions comprising:

instructions for determining occurrence of a traffic burst between the wireless device and the base station, the traffic burst comprising an initial active time slot having a first non-zero grant allocation that satisfies a threshold value and a last active time slot having a second non-zero grant allocation that does not satisfy the threshold value;

instructions for estimating an individual latency value for a time period with zero grant allocation within the traffic burst;

instructions for processing the individual latency value to obtain an estimated latency statistic; and instructions for initiating at least one latency mitigation action when the estimated latency statistic satisfies a pre-determined latency threshold value.

* * * * *